United States Patent
Sugimoto

(10) Patent No.: US 6,995,802 B2
(45) Date of Patent: Feb. 7, 2006

(54) IMAGE BINARIZATION METHOD AND BINARY IMAGE CREATION METHOD

(76) Inventor: Keiichi Sugimoto, 1-1-2-402 Kissyoin-Ishihara-Osadacho, Minamiku, Kyoto-shi (JP)

(\*) Notice: Subject to any disclaimer, the term of this patent is extended or adjusted under 35 U.S.C. 154(b) by 708 days.

(21) Appl. No.: 09/964,655

(22) Filed: Sep. 28, 2001

(65) Prior Publication Data

US 2002/0036711 A1 Mar. 28, 2002

(30) Foreign Application Priority Data

Sep. 28, 2000 (JP) ...................................... 2000-295849

(51) Int. Cl.
*H03M 1/12* (2006.01)

(52) U.S. Cl. ........................ 348/573; 348/715; 348/716
(58) Field of Classification Search ................. 348/573, 348/814, 815, 816, 572; 382/251, 270, 272, 382/273; H03M 1/12
See application file for complete search history.

(56) References Cited

U.S. PATENT DOCUMENTS

| | | | | |
|---|---|---|---|---|
| 3,637,927 A | \* | 1/1972 | Krause | 348/574 |
| 3,878,323 A | \* | 4/1975 | Fisher | 348/573 |
| 3,911,212 A | \* | 10/1975 | Yoshizawa et al. | 348/573 |
| 4,736,443 A | \* | 4/1988 | Miyagawa et al. | 382/282 |
| 5,121,207 A | \* | 6/1992 | Herrmann | 348/573 |
| 5,604,536 A | \* | 2/1997 | Takaiwa et al. | 348/231.8 |
| 5,937,146 A | \* | 8/1999 | Tateno et al. | 358/1.9 |
| 5,949,441 A | \* | 9/1999 | Ristau | 345/533 |

FOREIGN PATENT DOCUMENTS

| | | |
|---|---|---|
| JP | 59-064917 | 4/1984 |
| JP | 01-267425 | 10/1989 |
| JP | 04-175985 | 6/1992 |
| JP | 04-255078 | 9/1992 |
| JP | 04-368065 | 12/1992 |
| JP | 04-372073 | 12/1992 |
| JP | 05-180781 | 7/1993 |

OTHER PUBLICATIONS

Office Action by Japanese Patent Examiner, issued by Japanese Patent Office during examination of JP 2000–295849. Two pages.

\* cited by examiner

*Primary Examiner*—John Miller
*Assistant Examiner*—Trang U. Tran
(74) *Attorney, Agent, or Firm*—Griffin & Szipl, P.C.

(57) ABSTRACT

An image binarization method having highest fidelity for multi-digitized luminance data, and a binary image creation method by which images can be obtained in real-time without post-processing. Thresholds in binarization are not fixed, but set in accordance with changes in luminance, thus allowing real time images to be obtained.

14 Claims, 4 Drawing Sheets

FIRST PROCESSING

IMAGE BINARIZATION METHOD AND BINARY IMAGE CREATION METHOD

BACKGROUND OF THE INVENTION

1. Field of the Invention

The present invention relates to an image binarization method and a binary image creation method that are directly required for television images, in particular, an image binarization method and a binary image creation method wherein thresholds in binarization are not fixed, but set in accordance with changes in luminance, and real-time images can be obtained.

The more vivid such a binary image, the easier the automated inspection of imaged objects and shape judgement including character detection, and this is efficient.

2. Description of the Related Art

In Japanese Unexamined Patent Publication No. H01-267425, an image processing method and device for imaging systems are disclosed, wherein video signals are binarized at a desired level and stored in a plurality of frame (image) memories, and then logical processing between pixels is carried out between frame memories, and binarization is carried out again.

In Japanese Unexamined Patent Publication No. H04-255078, an image processing device is disclosed, wherein, with respect to a change in luminance distribution of a part of an image, a binarization reference value is determined by means of a histogram of the abovementioned part.

Likewise, in Japanese Unexamined Patent Publication No. H04-372073, a threshold determination method for binarization is disclosed wherein a threshold is determined by means of each histogram of the contrast intensity and opposing intensity.

In Japanese unexamined Patent Publication No. H05-180781, a surface defective inspection method and device are disclosed wherein two images are obtained, and smoothing is applied to one image and an offset value is evenly added to determine a threshold, and the other image is binarized.

In Japanese Unexamined Patent Publication No. H04-175985, a number of thresholds, which start from the central value of the density level and are successively changed to higher and lower values are set, and binarized, and the thresholds at which the detected number of characters and the known number of characters become equal to each other are selected, and then a desired threshold is set.

It has been conventionally demanded that multi-digitized luminance data obtained by digitally converting video signals from an imaging device for each pixel on each horizontal scanning line is used, and converted into binary data in a form with the highest fidelity for the data to create an image.

Threshold setting for binarization and binarizing conversion are executed after video signals are collected and stored in image memories as digital values in all the abovementioned conventional examples, that is, the setting and processing are executed as post-processing during image processing.

SUMMARY OF THE INVENTION

The objects of the invention are to provide a method for converting a proper image into binary data for each pixel in a form with the highest fidelity for multi-digitized luminance data, and provide a binary image creation method whereby real-time images can be obtained without post-processing.

As a first processing, after reading-out processing from one horizontal line memory, multi-digitized luminance data obtained by digitally converting video signals from an imaging device for each pixel on each horizontal scanning line is stored in an even-numbered row horizontal line memory if the current horizontal scanning line is an even-numbered row, or in an odd-numbered row horizontal line memory if the current horizontal scanning line is an odd-numbered row, and in said multi-digitized luminance data on the current scanning line, detected maximum value $MAX_i$ and minimum value $MIN_j$ exceeding a predetermined displacement level, and addresses $MAXP_i$ and $MINP_j$ of the detected pixel positions are stored in an even-numbered row detection memory if the current horizontal scanning line is an even-numbered row, or an odd-numbered row detection memory if the current horizontal scanning line is an odd-numbered row, and as a second processing, reading-out is carried out from the even-numbered row detection memory if the current horizontal scanning line is an odd-numbered row or the odd-numbered row detection memory if the current horizontal scanning line is an even numbered row, and based on floating thresholds $FT_h = MIN_j + (MAX_i - MIN_j) \times K$ (herein, K is an emphasis coefficient between 0 and 1, and h, i, and j are integers starting from zero) for each section $X_h$ of the horizontal pixel address row set by means of operation, multi-digitized data, which has been read-out from said one horizontal line memory, even-numbered row horizontal line memory if the current horizontal scanning line is an odd numbered row, or an odd-numbered row horizontal line memory if the horizontal scanning line is an even-numbered row, is converted into binary data for each pixel, and preferably, only the first processing is carried out for the first horizontal scanning line, and the second processing is carried out for the final horizontal scanning line, whereby the first object of the invention is achieved.

On the other hand, as a first processing, multi-digitized luminance data obtained by digitally converting video signals from an imaging device for each pixel on each horizontal scanning line is stored in a horizontal line memory row of an image memory corresponding to the current horizontal scanning line, and in said multi-digitized luminance data on the current scanning line, detected maximum value $MAX_i$ and minimum value $MIN_j$ exceeding a predetermined displacement level, and addresses $MAXP_i$ and $MINP_j$ of the detected pixel positions are stored in a specific one of at least two detection memories, and as a second processing, reading-out is carried out from the detection memory specified by the horizontal scanning line, and based on floating thresholds $FT_h = MIN_j + (MAX_i - MIN_j) \times K$ (herein, K is an emphasis coefficient between 0 and 1, and h, i, and j are integers starting from zero) for each section $X_h$ of the horizontal pixel address row set by means of operation, multi-digitized data that has been read from the horizontal line memory row of the image memory corresponding to the previous horizontal scanning line is converted into binary data for each pixel and rewritten, and preferably, only the first processing is carried out for the first horizontal scanning line, and only the second processing is carried out for the final horizontal scanning line.

In accordance with hardware environments involving an increase in the speed of microprocessor machine cycles, improvement in conversion rates of A/D converters, and an increase in the speed of memory accessing times, an exclusive circuit has become realizable in which setting and conversion of binarization threshold values in multi-digitized luminance data obtained by digitally converting video signals from an imaging device for each pixel of each horizontal scanning are executed at high speed in real-time in time intervals between pixels.

The abovementioned processing includes the first processing and second processing to be executed between pixels in horizontal scanning. In the first processing, preferably, binarization basic data and threshold setting basic data by means of current horizontal scanning are collected by alternately using one horizontal line memory and two detection memories between even-numbered rows and odd-numbered rows of horizontal scanning, and in the second processing, floating threshold values for each section $X_h$ of the horizontal pixel address row are set by means of operation from the basic data obtained by the horizontal scanning, and binarizing conversion is executed between the same pixels in real-time, or thus obtained binary data is directly collected and stored in image memories in real-time.

The invention provides a method for converting proper images into binary data for each pixel in a form with the highest fidelity for multi-digitized luminance data and a binary image creation method by which images are obtained in real-time without post-processing.

DETAILED DESCRIPTION OF THE PREFERRED EMBODIMENT

Preferred examples of the invention are explained with reference to the drawings.

Figure 1:
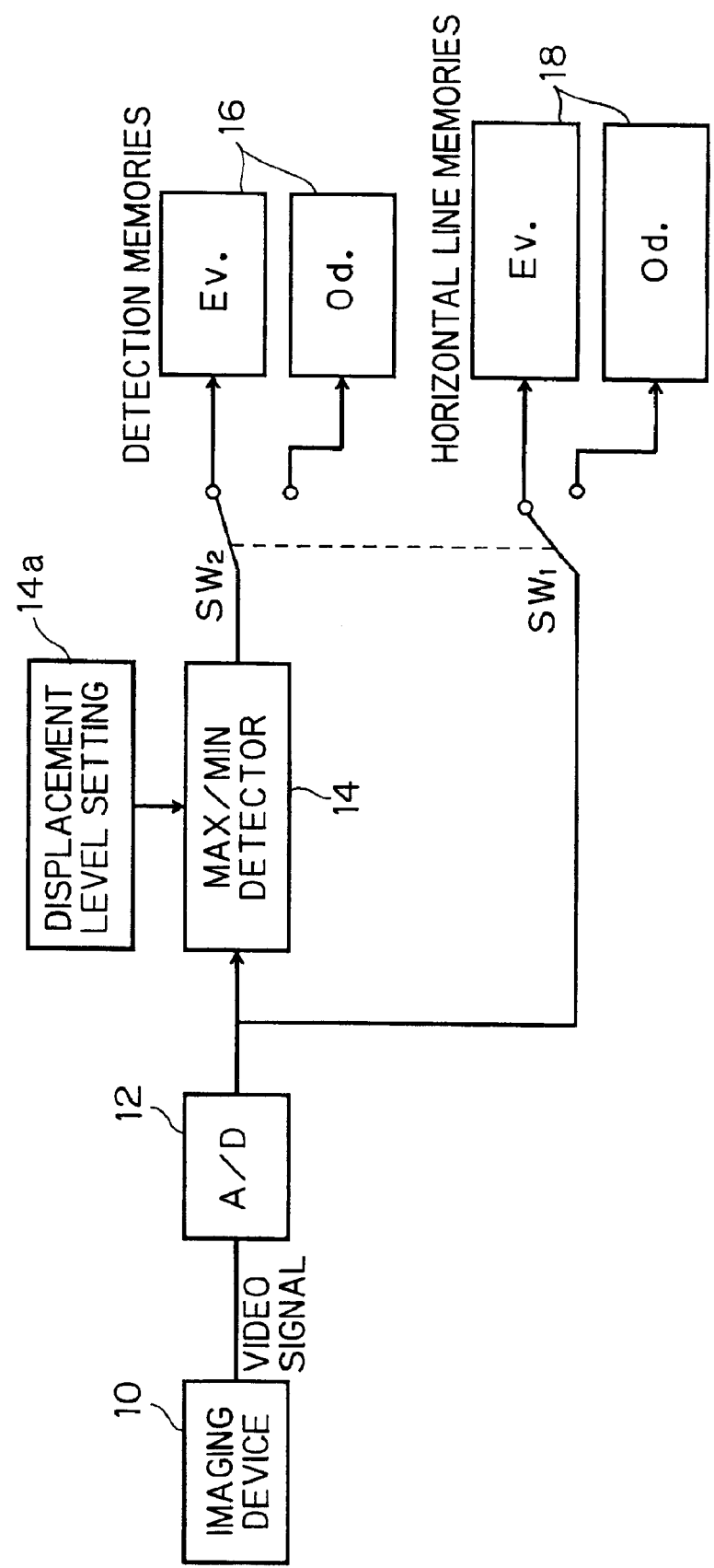
FIG. 1 is a schematic systematic block diagram showing an example of the first processing according to the invention.
Figure 2:
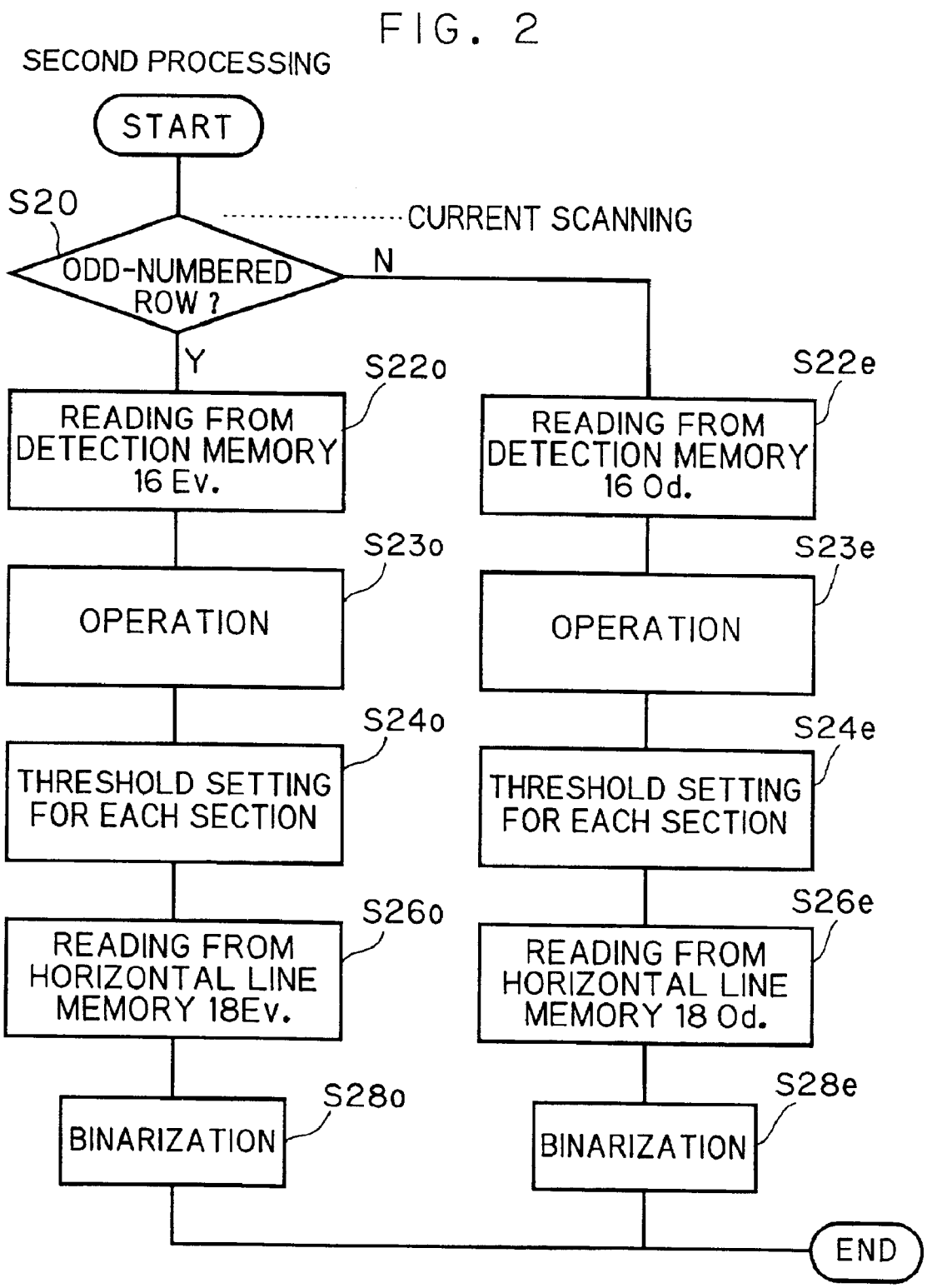
FIG. 2 is a flowchart showing an example of the second processing.
Figure 3:
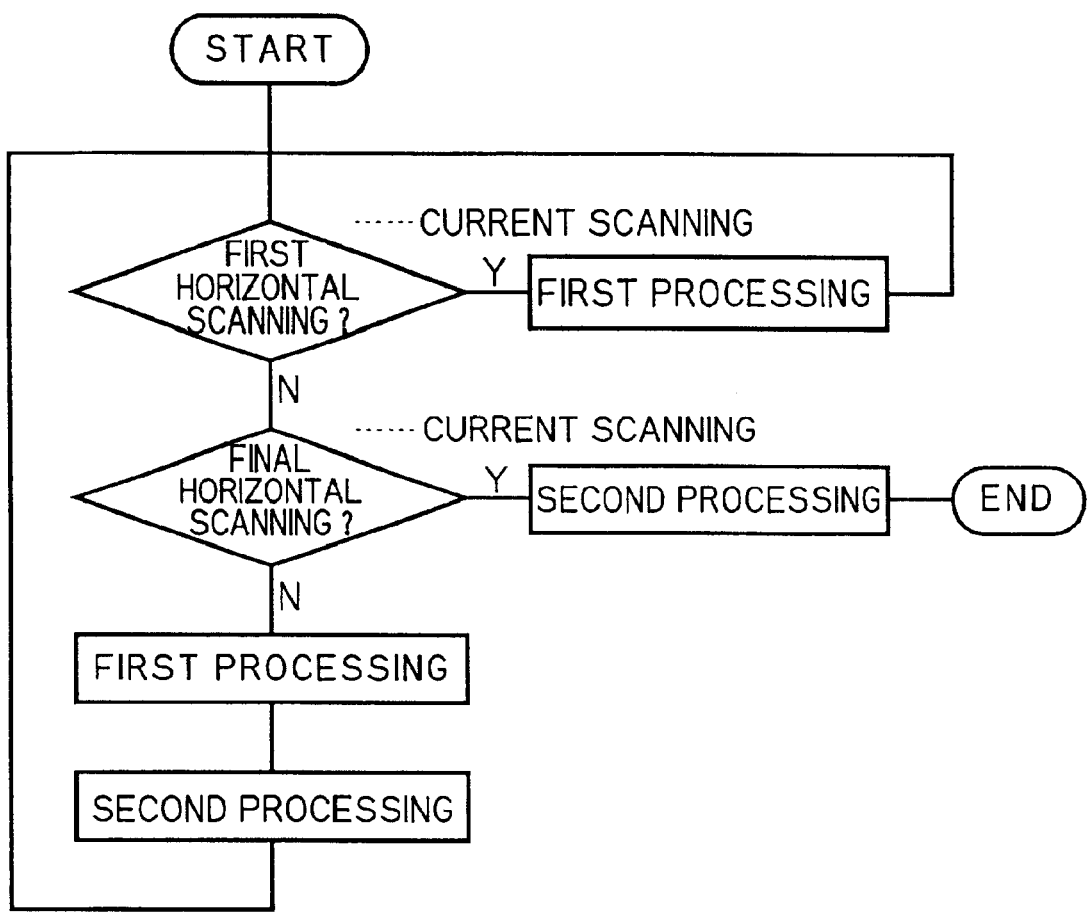
FIG. 3 is a flowchart showing an example including the first processing and second processing.
Figure 4:
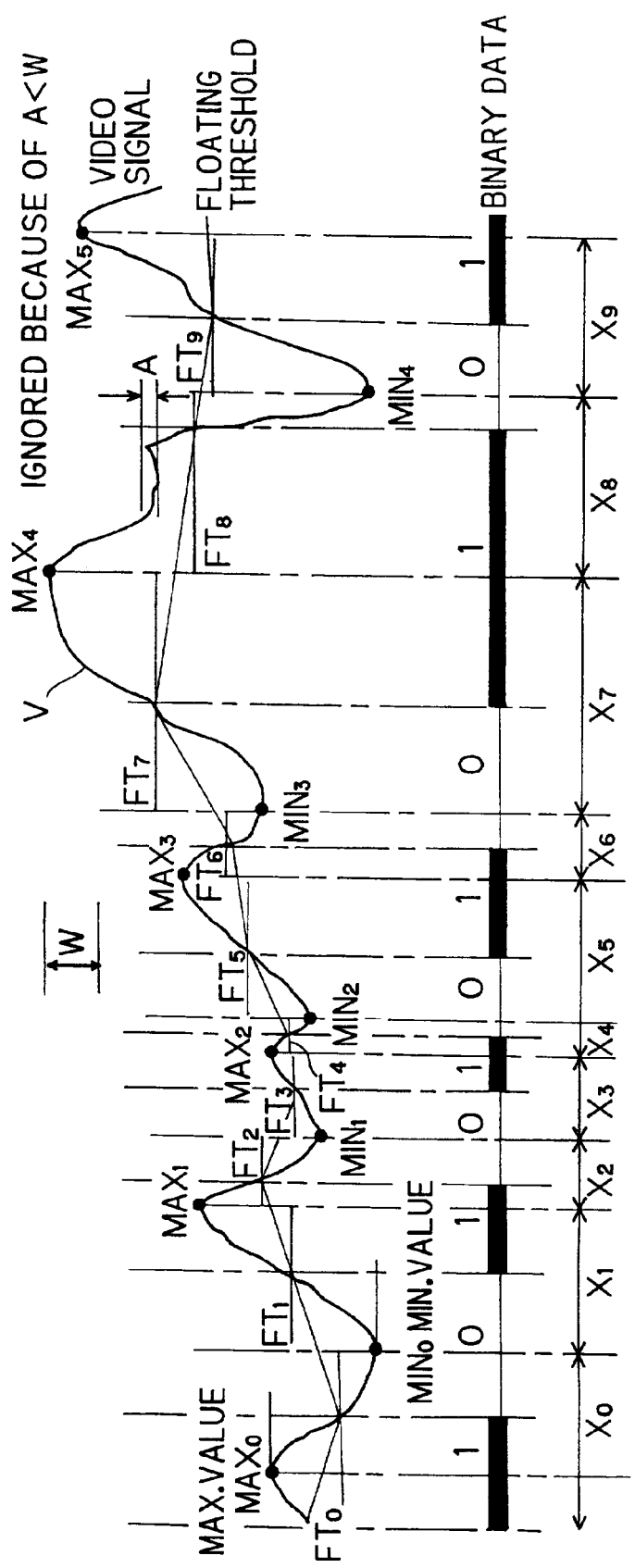
FIG. 4 is an explanatory view showing an example.

FIG. 1 is a schematic systematic block diagram showing an example of the first processing of the invention, FIG. 2 is a flowchart showing an example of the second processing, and FIG. 3 is a flowchart showing an example including the first processing and second processing, and FIG. 4 is a conceptional explanatory view showing an example.

In FIG. 4, a video signal V as an output signal from imaging device 10 such as a television camera is shown on the horizontal scanning lines. This video signal V is digitally converted for each pixel on each horizontal scanning line and shown along the vertical axis as multi-digitized luminance data, and the horizontal axis shows address rows corresponding to time intervals or horizontal pixels.

The image binarization method according to the invention comprises the first processing and second processing to be applied for each interval of pixels of each horizontal scanning. The first processing is carried out as follows.

Multi-digitized luminance data obtained by converting video signals from imaging device 10 for each pixel on each horizontal scanning line by digital converter 12 is stored in an even-numbered row horizontal line memory 18Ev. if the current horizontal scanning line is an even-numbered row, or in an odd-numbered row horizontal memory 18Od. if the scanning line is an odd-numbered row by soft switch SW1.

On the other hand, at the same time, as shown in FIG. 4, the video signal V starts to rise, and then starts to lower from the point $MAX_0$, and when the lowering degree exceeding the displacement level W is detected (see the detector 14 of FIG. 1), the data of this point as a maximum value $MAX_0$ and the position of the detected horizontal pixel $MAXP_0$ are written into an even-numbered row detection memory 16Ev. if the current horizontal scanning line is an even-numbered row, or an odd-numbered row detection memory 16Od. if the line is an odd-numbered row by the soft switch SW, and likewise, when the signal starts to rise from the point $MIN_0$ and a rise by the displacement level W is detected, the data of this point as a minimum value $MIN_0$ and the position $MINP_0$ of the detected pixel are written in the same manner.

Thus, successively, respective data of the maximum value $MAX_1$, minimum value $MIN_1$, maximum value $MAX_2$, minimum value $MIN_2$, maximum value $MAX_3$, minimum value $MIN_3$, maximum value $MAX_4$, minimum value $MIN_4$, and maximum value $MAX_5$ and the respective positions $MAXP_{1-5}$ and $MINP_{1-4}$ (not shown) of the detected pixels are written into an even-numbered row detection memory 16Ev. if the current horizontal scanning line is an even-numbered row, or an odd-numbered row detection memory 16Od. if the line is an odd-numbered row. In the illustration, as shown by the level A, if the displacement width is less than the displacement level W, the displacement starting point is not regarded as a maximum or minimum value point (see the displacement level setting 14a of FIG. 1).

The second processing is carried out as shown in FIG. 2. In Step S20, it is judged whether or not the current horizontal scanning line is an odd-numbered row, and if it is an odd-numbered row, reading-out is carried out from the detection memory 16Ev. in step S22o, and in step S23o, a floating threshold $FT_h = MIN_j + (MAX_i - MIN_j) \times K$ (herein, K is an emphasis coefficient between 0 and 1, and h, i, and j are integers starting from zero) of a section $X_h$ is operated if the current pixel position is a starting point of the section $X_h$ of the horizontal address row. Then, in step S24o, for example, as shown in FIG. 4, a floating threshold $FT_0 = MIN_0 + |MAX_0 - MIN_0| \times K$ of the horizontal address row section $X_0$ is set, and likewise, floating thresholds $FT_1$ through $FT_9$ and $FT_{end}$ are set from the horizontal address rows $X_1$ through $X_9$ and the terminal, and multi-digitized data that has been read-out from the horizontal line memory 18Ev. up to step S26o is converted into binary data and outputted in order based on the floating thresholds in step S28o (see FIG. 4). In addition, when the pixel position is other than the starting point, operation is skipped, and thresholds that have been previously set are applied as they are. $FT_0$ is specially applied up to the $MAXP_0$ of the section $X_0$.

It is judged whether or not the current horizontal scanning row is an odd-numbered row, and if it is an even-numbered row, reading-out is carried out from the detection memory 16Od. in step S22e, and thresholds $FT_h$ for each section $X_h$ as mentioned above are operated and set in steps S23e and S24e, and multi-digitized data that has been read-out from the horizontal line memory 18Od. up to step S26e is converted into binary data in order based on the floating thresholds and outputted in Step S28e. Also, if the pixel position is other than the starting point, operation is skipped and thresholds that have been previously set are applied as they are.

According to the preferable example of the invention, as shown in FIG. 3, only the first processing is carried out for the first horizontal scanning, and only the second processing is carried out for the final horizontal scanning.

According to another example, in place of the horizontal line memories mentioned above, horizontal line memory rows of the image memory are used, and binary images are directly created from vertical synchronizing signals.

According to the abovementioned examples, as illustrated in FIG. 1 and FIG. 2, two detection memories and two horizontal line memories are alternately efficiently used, however, only one horizontal line memory may be used, and in this case, writing is carried out after reading-out for each pixel, so that a part of the illustrated second processing is carried out in the first processing, and read-out multi-digitized data is converted into binary data by the second processing.

Concretely, as the first processing, multi-digitized luminance data obtained by digitally converting video signals from an imaging device for each pixel on each horizontal scanning line that has been stored in one horizontal line memory in the previous horizontal scanning is read-out and then stored, and in the multi-digitized luminance data on the current scanning line, detected maximum value $MAX_i$ and minimum value $MIN_j$ exceeding a predetermined displacement level, and addresses $MAXP_i$ and $MINP_j$ of the detected pixel positions are stored in an even-numbered row detection memory if the current horizontal scanning line is an even-numbered row, or an odd-numbered row detection memory if the line is an odd-numbered row, and as the second processing, reading-out is carried out from the even-numbered row detection memory if the current horizontal scanning line is an odd-numbered row, or the odd-numbered row detection memory if the line is an even-numbered row, and based on floating thresholds $FT_h=MIN_j+(MAX_i-MIN_j) \times K$ (herein, K is an emphasis coefficient between 0 and 1, and h, i, and j are integers starting from zero) for each section $X_h$ of the horizontal pixel address row set by means of operation, the multi-digitized data of the previous horizontal scanning read out by the first processing is converted into binary data for each pixel.

However, if the same effects as in the invention are achieved by ignoring such efficiency and designing more memory, such design shall belong to the scope of the invention.

According to the illustration of FIG. 4, although the maximum value $MAX_0$ is detected first in the horizontal scanning, there is a case where a minimum value $MIN_0$ is detected first.

If the emphasis coefficient K in the floating threshold FT is simply set to a central value (K=0.5), particularly, characters and the like cannot be obtained in the form of clear images. Therefore, it has been proved that white characters are effectively reflected on a black background when floating thresholds FT are determined by setting the emphasis coefficient K>0.5, and black characters are effectively reflected on a white background when floating thresholds FT are determined by setting the emphasis coefficient K<0.5.

Furthermore, it has also been proved that fineness or roughness of the entirety of an image is effectively reflected when the maximum and minimum values are detected by lowering or raising the displacement level W.

What is claimed is:

1. An image binarization method, wherein
as a first processing, multi-digitized luminance data obtained by digitally converted video signals from an imaging device for each pixel on each horizontal scanning line is stored in an even-numbered row horizontal line memory if the current horizontal scanning line is an even-numbered row, and is stored in an odd-numbered row horizontal line memory if the horizontal scanning line is an odd-numbered row, and in said multi-digitized luminance data on the current scanning line, detected maximum value $MAX_i$ and minimum value $MIN_j$ exceeding a predetermined displacement level, and addresses $MAXP_i$ and $MINP_j$ at the detected pixel positions are stored in an even-numbered detection memory if the current horizontal scanning line is an even-numbered row, or in an odd-numbered row detection memory if the current horizontal scanning line is an odd-numbered row; and
as a second processing, reading-out is carried out from the even-numbered detection memory if the current horizontal scanning line is an odd-numbered row, or from the odd-numbered detection memory if the current horizontal scanning line is an even-numbered row, and based on floating thresholds $FT_h=MIN_j+(MAX_i-MIN_j) \times K$ wherein K is an emphasis coefficient between 0 and 1, and h, i, and j are integers starting from zero for each section $X_h$ of the horizontal pixel address row set by means of operation, the multi-digitized data read out from the even-numbered horizontal line memory in the case of the odd-numbered row or the odd-numbered horizontal line memory in the case of the even-numbered row is converted into binary data.

2. An image binarization method according to claim 1, wherein only the first processing is carried out for the first horizontal scanning line, and only the second processing is carried out for the final horizontal scanning line.

3. An image binarization method according to claim 1, wherein the floating threshold FT is determined by setting the emphasis coefficient K=0.5.

4. An image binarization method according to claim 1, wherein the floating threshold FT is determined by setting the emphasis coefficient K>0.5, and white characters are effectively reflected on a black background.

5. An image binarization method according to claim 1, wherein the floating threshold FT is determined by setting the emphasis coefficient K<0.5, and black characters are effectively reflected on a white background.

6. An image binarization method according to claim 1, wherein the fineness of the entirety of an image is effectively reflected by lowering the displacement level.

7. An image binarization method according to claim 2, wherein the floating threshold FT is determined by setting the emphasis coefficient K=0.5.

8. An image binarization method according to claim 2, wherein the floating threshold FT is determined by setting the emphasis coefficient K>0.5, and white characters are effectively reflected on a black background.

9. An image binarization method according to claim 2, wherein the floating threshold FT is determined by setting the emphasis coefficient K<0.5, and black characters are effectively reflected on a white background.

10. An image binarization method according to claim 2, wherein the fineness of the entirety of an image is effectively reflected by lowering the displacement level.

11. A binary image creation method, wherein
as a first processing, multi-digitized luminance data obtained by digitally converting video signals from an imaging device for each pixel on each horizontal scanning line is stored in a horizontal line memory row of an image memory corresponding to the current horizontal scanning line, and detected maximum value $MAX_i$ and minimum value $MIN_j$ exceeding a predetermined displacement level, and addresses $MAXP_i$ and $MINP_j$ of the detected pixel positions are stored in a specific one of at least two detection memories; and
as a second processing, reading-out is carried out from the detection memory specified by the previous horizontal scanning line, and based on floating thresholds $FT_h = MIN_j+(MAX_i-MIN_j) \times K$ wherein K is an emphasis coefficient between 0 and 1, and h, i, and j are integers starting from zero for each section $X_h$ of the horizontal pixel address row set by means of operation, the multi-digitized data read out from the horizontal line memory row of the image memory corresponding to the previous horizontal scanning line is converted into binary data for each pixel and rewritten.

12. A binary image creation method according to claim 11, wherein only the first processing is carried out for the first horizontal scanning line and only the second processing is carried out for the final horizontal scanning line.

13. An image binarization method, wherein as a first processing, multi-digitized luminance data obtained by digitally converting video signals from an imaging device for each pixel on each horizontal scanning line that has been stored in one horizontal line memory in the previous horizontal scanning is read-out and then stored, and in the multi-digitized luminance data on the current scanning line, detected maximum value $MAX_i$ and minimum value $MIN_j$, and the addresses $MAXP_i$ and $MINP_j$ of the detected pixel positions thereof are stored in an even-numbered row detection memory if the current horizontal scanning line is an even-numbered row, or stored in an odd-numbered detection memory in the case of an odd-numbered row; and as a second processing, data reading is carried out from the even-numbered row detection memory when the current horizontal scanning line is an odd-numbered row, or from the odd-numbered row detection memory in the case of an even-numbered row, and based on floating thresholds $FT_h = MIN_j+(MAX_i-MIN_j) \times K$ wherein K is an emphasis coefficient between 0 and 1, and h, i, and j are integers starting from zero for each section $X_h$ of the horizontal pixel address row set by means of operation, the multi-digitized data of the previous horizontal scanning read-out by the first processing is converted into binary data for each pixel.

14. An image binarization method, wherein as a first processing, multi-digitized luminance data obtained by digitally converting video signals from an imaging device for each pixel on each horizontal scanning line is stored in a specific one of at lest two horizontal line memories, and in the multi-digitized luminance data on the current scanning line, detected maximum value $MAX_i$ and minimum value $MIN_j$ exceeding a predetermined displacement level, and the addresses $MAXP_i$ and $MINP_j$ of the detected pixel positions are stored in a specific one of at least two detection memories; and as a second processing, reading-out is carried out from the detection memory specified by the previous horizontal scanning line, and based on floating thresholds $FT_b = MIN_j+(MAX_i-MIN_j) \times K$ wherein K is an emphasis coefficient between 0 and 1, and h, i, and j are integers starting from zero for each section $X_h$ of the horizontal pixel address row set by means of operation, multi-digitized data read-out from the previous horizontal line memory specified by the horizontal scanning line is converted into binary data for each pixel.

* * * * *